(12) United States Patent
Neveitt et al.

(10) Patent No.: US 8,078,617 B1
(45) Date of Patent: Dec. 13, 2011

(54) MODEL BASED AD TARGETING

(75) Inventors: William T. Neveitt, Cupertino, CA (US); Ralph U. Gasser, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 395 days.

(21) Appl. No.: 12/356,342

(22) Filed: Jan. 20, 2009

(51) Int. Cl.
G06F 17/30 (2006.01)

(52) U.S. Cl. .......................................... 707/732; 707/5

(58) Field of Classification Search .................. 707/4, 5, 707/723, 718, 999, 3
See application file for complete search history.

(56) References Cited

U.S. PATENT DOCUMENTS

| | | | |
|---|---|---|---|
| 6,185,558 B1 * | 2/2001 | Bowman et al. .............. 705/37 |
| 6,564,213 B1 * | 5/2003 | Ortega et al. ........................... 1/1 |
| 7,031,961 B2 * | 4/2006 | Pitkow et al. ........................... 1/1 |
| 7,647,314 B2 * | 1/2010 | Sun et al. ...................... 707/742 |
| 7,672,969 B1 * | 3/2010 | Gawdiak et al. ....... 707/999.102 |
| 7,693,829 B1 * | 4/2010 | Alshawi ................. 707/999.003 |
| 7,756,860 B2 * | 7/2010 | Hamilton et al. ............. 707/718 |
| 7,849,076 B2 * | 12/2010 | Zheng et al. ................... 707/715 |
| 7,853,589 B2 * | 12/2010 | Svore et al. .................... 707/728 |
| 7,860,852 B2 * | 12/2010 | Brunner et al. ............... 707/706 |
| 7,917,480 B2 * | 3/2011 | Dean et al. .................... 707/693 |
| 2004/0117367 A1 * | 6/2004 | Smith et al. ...................... 707/5 |
| 2006/0020596 A1 * | 1/2006 | Liu et al. ........................... 707/6 |
| 2009/0006360 A1 * | 1/2009 | Liao et al. ......................... 707/5 |
| 2009/0112830 A1 * | 4/2009 | Denoue et al. .................... 707/4 |
| 2009/0276414 A1 * | 11/2009 | Gao et al. .......................... 707/5 |
| 2010/0169313 A1 * | 7/2010 | Kenedy et al. ................ 707/736 |
| 2011/0099059 A1 * | 4/2011 | Agarwal et al. ............ 705/14.43 |

* cited by examiner

*Primary Examiner* — James Trujillo
*Assistant Examiner* — Thong Vu
(74) *Attorney, Agent, or Firm* — Fish & Richardson P.C.

(57) ABSTRACT

System and method for quickly selecting content items (e.g., documents) having highest ranking scores in response to a query for content items. Base scores for a plurality of content items are determined based on attributes of the content items. One or more attributes are extracted from the query, the base scores of at least some of the content items are adjusted based on relationships between the query attributes and the content item attributes. A subset of the plurality of content items having the highest adjusted scores are selected, and the selected subset of content items are output.

33 Claims, 7 Drawing Sheets

MODEL BASED AD TARGETING

BACKGROUND

This disclosure relates to information management.

In some examples, when a user sends a query to a server to request information, the server returns results in response to the query and sponsored content (e.g., advertisements, or ads) that is relevant to the query. The server may automatically select ads using a two-step process. In the first step, a set of candidate ads are selected from a large pool of ads. For keyword-based ads, the candidate ads can be selected based on matching the query with a set of keywords associated with each ad. For keyword-less ads, the candidate ads can be selected based on matching features associated with the query and ads. For example, the features can include categorizations of the query and the ad, a relevance score between the query and creative text of the ad, and features derived from a landing page of the ad. In the second step, the candidate ads are ranked and the best N (N being an integer) ads are selected. The best N ads are served to the user.

SUMMARY

The present disclosure includes a system and method for quickly selecting content items (e.g., documents) having highest ranking scores in response to a query for content items.

In general, in one aspect, base scores for a plurality of content items are determined based on attributes of the content items; a query is received; one or more attributes are extracted from the query; the base scores of at least some of the content items are adjusted based on relationships between the query attributes and the content item attributes; a subset of the plurality of content items having the highest adjusted scores are selected; and the selected subset of content items are output.

Implementations may include one or more of the following features. The content items can include, e.g., ads. The content items can include, e.g., documents. Keywordless ad targeting can be performed in which the query includes a request for ads, and the subset of ads are selected without matching ad keywords with query keywords. The attributes of the query can include a property of (a) one or more keywords of a search query or (b) a web page on which an ad is to be displayed. The base scores can be determined prior to receiving the query. An index structure can be generated in which the content items are arranged in lists, and within each list the content items are sorted according to the base scores. The index structure can include parallel lists, each list being associated with a corresponding content item attribute and including content items having the corresponding attribute. The index structure can be transformed to generate a transformed index structure such that each content item appears in only one of the lists in the transformed index structure. Selecting a subset of the plurality of content items having the highest adjusted scores can include using the transformed index structure to select the subset of the plurality of content items having the highest adjusted scores. Adjusting the scores of at least some of the content items can include adjusting the scores of some of the content items having higher scores in the lists and not adjusting the scores of some of the content items having lower scores in the lists. Adjusting the scores of at least some of the content items can include using an odds model to determine the adjustments to the scores. The odds model can be updated to include information about new content items, and the updated odds model can be used to select a number of content items having highest adjusted scores in response to a second query. The odds model can include an odds map representing a first mapping relationship that maps query keys to doc keys and a second mapping relationship that doc keys to content items, the query keys representing features of queries and the doc keys representing features of ads. The odds model can include a template function to convert a query and content item pair to a collection of features used for prediction. Adjusting the scores of at least some of the content items can include determining which content item attributes are affected by the attributes of the received query, and adjusting the scores of the content items whose attributes are affected by the attributes of the received query.

In general, in another aspect, a first map that links query keys to content item keys is generated, the query keys representing features of queries, the content item keys representing features of content items; a second map that links content item keys to content items to indicate which content items are associated with each content item feature is generated; and the first and second maps are stored in a storage.

Implementations may include one or more of the following features. A set of template functions that converts content item and query pairs into a set of features used for prediction can be generated. A query can be received, features can be extracted from the query using the template function, scores for a plurality of the set of content items can be determined based on the features of the query, the first map, and the second map, and a subset of the content items having the highest scores can be output. The content items can include, e.g., ads. The content items can include, e.g., documents.

In general, in another aspect, a query is received, a subset of content items having highest scores are identified among a set of content items based on information about features of the query, a first predetermined mapping relationship between query features and content item features, and a second predetermined mapping relationship between content item features and content items. Adjustments to pre-computed baseline scores are computed, in which the pre-computed baseline scores are associated with content items having features that are affected by the features of the received query according to the first and second mapping relationships; and the subset of content items having the highest scores are output.

Implementations may include the following feature. The content items can include, e.g., ads. The content items can include, e.g., documents.

In general, in another aspect, an odds model is trained over a training set of queries and content items, the odds model including a query map that has information about how features of queries affect features of content items, each query feature being associated with one or more content item features, and a content item map that has information about which content items in the training set of content items are associated with each content item feature; and the odds model is output.

Implementations may include one or more of the following features. A query can be received, and the odds model can be used to select a subset of content items having highest scores from among a set of content items in response to the query. The content items can include, e.g., documents. The content items can include, e.g., ads.

In general, in another aspect, a query is received, a first subset of content items having highest approximate scores are identified among a set of content items based on information about features of the query and an approximate odds model, the approximate odds model including a first predetermined mapping relationship between query features and content item features, and a second predetermined mapping relationship between content item features and content items. An exact odds model is applied to determine exact scores of the first subset of content items. A second subset of content items having highest exact scores among the first subset of content items are output.

Implementations may include one or more of the following features. The first subset of content items can be identified by computing adjustments to pre-computed baseline scores for content items having features that are affected by the features of the received query according to the first and second mapping relationships. The content items can include, e.g., documents. The content items can include, e.g., ads.

In general, in another aspect, a system includes a storage to store scores of a plurality of content items in which the scores are determined based on features of the content items; and a processing device to receive a query, extract one or more features from the query, adjust the scores of at least some of the content items based on relationships between the query features and the content item features, and select a subset of the plurality of content items having the highest adjusted scores.

Implementations may include one or more of the following features. The content items can include, e.g., documents. The content items can include, e.g., ads.

In general, in another aspect, a system includes means for storing scores of a plurality of content items in which the scores are determined based on attributes of the content items; and means for receiving a query, extracting one or more attributes from the query, adjusting the scores of at least some of the content items based on relationships between the query attributes and the content item attributes, and selecting a number of content items having the highest adjusted scores from the plurality of content items.

These and other aspects and features, and combinations of them, may be expressed as methods, apparatus, systems, means for performing functions, program products, and in other ways.

Advantages of the aspects, systems, and methods may include zero or more of the following. Documents (e.g., ads) that are more relevant to queries can be selected in a short amount of time. High quality keywordless ad targeting can be performed. User experiences can be improved.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

System Overview

Figure 1:
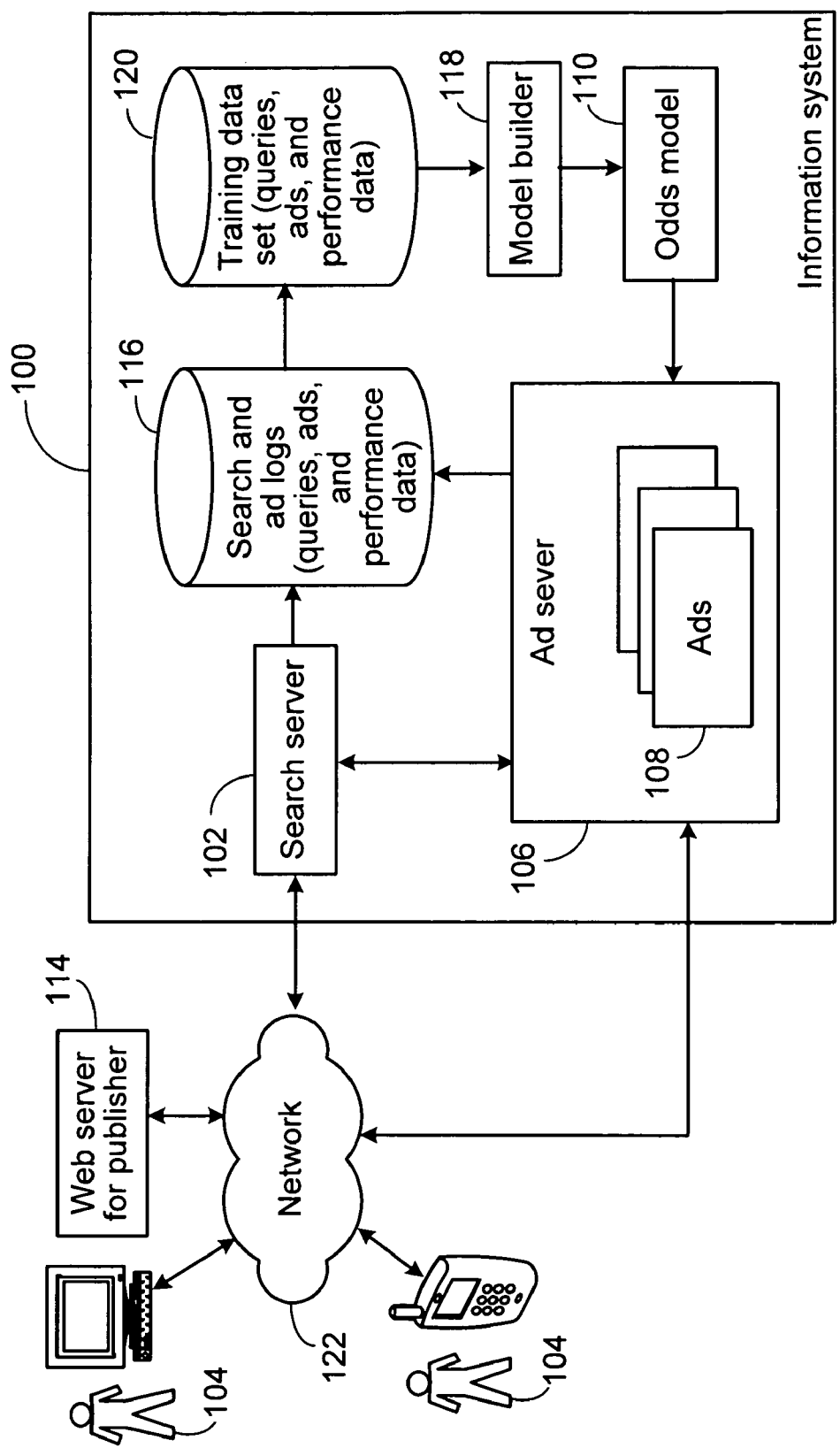
FIG. 1 is a schematic diagram of an example information system.

Referring to FIG. 1, in some implementations, an information system 100 selects, in response to a query, a subset of content items (e.g., documents) having highest scores from a set of content items (e.g., documents) based on an odds model 110. The odds model 110 is trained over past queries and content items to learn which content items are likely to have the highest scores in response to given queries. The scores can be determined based on, e.g., a ranking function or an auction function. The odds model 110 has information about base scores of content items (e.g., documents) that are determined using only information about the content items (e.g., without knowledge of the queries), so the base scores can be pre-computed prior to receiving any queries. The odds model 110 also has information about how certain features of queries affect the base scores of content items having particular features. When a query is received, the information system 100 extracts relevant features from the query, uses the odds model 110 to identify the content items (e.g., documents) whose scores are affected by the query features, and calculates the scores for those content items without calculating the scores of other content items. The information system 100 then identifies the content items (e.g., documents) having the highest adjusted scores from among all of the content items.

For example, the content items can be broadcast on radio or television, transmitted through the Internet, or distributed in printed media, etc. The content items can be, e.g., sponsored content, or advertisements (ads). The ads can include, e.g., radio ads, television ads, printed ads, etc.

In the description below, documents are used as examples of the content items, and ads are used as examples of the documents. The techniques can also be used for other types of content items. The ad may include an ad creative and may be associated with zero or more ad descriptors (e.g., keywords or key phrases). The ad creative can define the content of the advertisement that is shown to the users. For example, the ad creative can be used to define text, images, audio, videos, and/or other data types, or combinations thereof, of the ad. The ad creative can also define a layout for the ad. The ads can be presented (or served) with a variety of on-line content, such as text messages, web pages, and video programs to users. The term "queries" as used in this document has a broad meaning and can refer to, for example, queries from end users or queries from web servers. Queries from users may include search queries asking for information related to certain keywords. Queries from web servers can be requests for ads to be placed on web pages served by the web servers. Other types of queries and documents can also be processed by the information system 100.

A unique feature of the information system 100 is that the system 100 can identify the subset of documents having the highest scores by calculating the scores for only a small number of documents without calculating the scores for all of the documents. Because the odds model 110 has information about which documents are affected by the query, the system 100 only has to calculate the scores for the documents whose scores are affected by the query. The subset of highest ranking documents selected by the system 100 using the odds model 110 are the same as those that would be selected if the ranking function were applied to all of the documents. This allows the system 100 to be highly scalable and can process a large number of documents in a very short time. For example, the system 100 can select one hundred best ads from a million ads in response to a request for ads from a web server within less than 10 milliseconds.

In this description, odds models are used as examples to determine the scores of the documents. Any scoring function that is computable based on separable functions of the query and the documents can be also be used instead of the odds models.

In some implementations, the information system 100 includes a search server 102 that receives search queries from users 104, searches a database to find results in response to the search queries, and delivers the search results to the users 104. The users 104 may send the search queries from, e.g., desktop computers or mobile phones. The search server 102 sends a query for ads to an ad server 106. The query for ads may include information about the language of the user search query, the geographical location where the user search query originated, the keywords of the user search query, etc. The ad server 106 selects ads 108 using the odds model 110 and the information provided by the query for ads from the search engine 102. In some examples, the ads 108 are presented with the search results to the users 104. In some examples, links to the ads 108 are provided with the search results to the users 104, and user applications (such as web browsers) retrieve the ads 108 based on the links and display the ads 108 along with the search results.

The ad server 106 also receives query for ads from a web server 114 that hosts web sites for a publisher. The publisher may participate in an ad network in which the publisher agrees to show ads on web sites hosted by the web server 114. The web sites may include web pages having reserved ad spaces for displaying ads. A query for ads sent by the web server 114 may include information about the web pages on which the ads will be displayed, the language the web pages are written in, the section titles or headings in the web pages, the geographical location where the web server 114 is located, and conditions or restrictions on the ads, e.g., ads having certain keywords or certain types of content should not be selected. The ad server 106 selects ads 108 using the odds model 110 and the information associated with the query for ads from the web server 114, and delivers the ads 108 to the web server 114.

The users 104 and the web server 114 may communicate with the information system 100 through a network 122, which can be, e.g., the Internet or other networks.

In some implementations, the ad server 106 uses an ad selection process to automatically select ads by approximating results of ideal auctions run over large sets of ads in which the same function is used to select candidate ads and rank the candidate ads. For a given query, the ad selection process produces a list of all the ads in sorted order, e.g., in descending order of the best probability of the ads being clicked by a user. This allows the ad selection process to quickly provide the best N (N being an integer) ads for any given query. This improves the quality of ads compared to a two-step ad selection process by reducing the likelihood that good ads are not selected during the first step even though the ads may be considered to be very good in the second step.

Initially, a model builder 118 uses information from a training data set 120 to build an odds ranking model (sometimes referred to simply as "odds model") 110 using machine learning techniques to learn what scores would result when particular ads are served in response to particular queries. The training data set 120 includes past queries, ads that were delivered in response to the queries, and performance data (e.g., scores) associated with the ads. The training data set 120 can be updated as the system receives additional queries and delivers additional ads, for example, based on a database 116 that includes search logs for logging information from the search server 102 and ad logs for logging information from the ad sever 106. The scores can be determined based on, e.g., an auction function. The model builder 118 analyzes pairs of queries and ads, and their corresponding performance data, and determines how features of queries and features of ads affect the scores.

In some implementations, an odds ranking model has two parts. First, a set of template functions that receives (document, query) pairs as inputs and generates a set of discrete keys (or features) as output. The template functions define how to convert a (document, query) pair to a collection of features used for prediction. The second part of the odds ranking model is an "odds map" having information about relationships among keys and how keys affect the odds or scores. The odds map have floating point numbers representing odds multipliers for the features that have been learned by the model.

Figure 2:
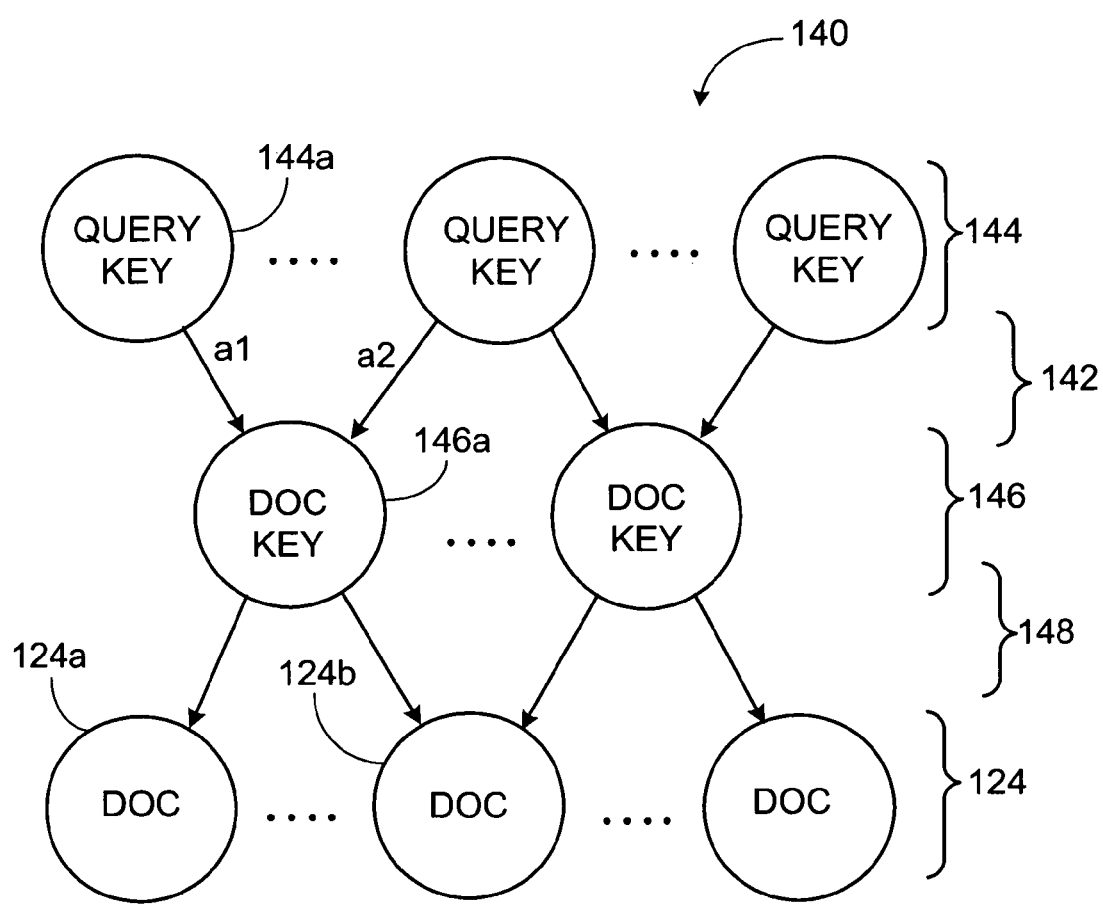
FIG. 2 is a diagram of an example odds map.

Referring to FIG. 2, in some implementations, an odds map 140 of an odds model 110 can be represented using two mapping relationships. A first mapping relationship 142 maps query keys 144 to doc keys 146. Query keys 144 represent features of queries, and doc keys 146 represent features of ads. The first mapping relationship 142 indicates that, if a query has a feature represented by a particular query key 144, the query feature will affect certain doc keys 146 that are linked to the query keys 144 according to the first mapping relationship 142.

A second mapping relationship 148 maps doc keys 146 to documents 124 (in this example, ads). The second mapping relationship 118 indicates which documents 124 have the features represented by the query keys 146. For a given query that has particular features, based on the first and second mapping relationships, the information system 100 can determine which query keys 144 represent the query features, which doc keys 146 are affected by the query keys 144, and which documents 124 have features represented by the doc keys 146 that are affected by the query keys 144. Note that the odds model 110 can be used to select documents other than ads.

Examples of the query keys 144 include the language of the user search query, the geographical location where the user search query originated, and the keywords of the user search query, etc. Examples of the doc keys 146 include the language in which the ad is written and keywords in the ad creative, etc.

The odds model 110 belongs to a particular class of models in which the effects of the query features on the performance and the effects of the ad features on the performance can be separated. The model builder 118 computes base scores for the ads according to the ad features alone. The base scores indicate that, if an ad has certain features it will have a certain performance score. For each link from a query key 144 to a doc key 146, the odds map 140 also provides an adjustment (or odds multiplier) representing the effect of the query key and doc key on documents associated with the doc key.

For example, suppose that the odds model 110 assigns an adjustment a1 to the link from a query key 144$a$ to a doc key 146$a$, and that ads 124$a$ and 124$b$ have features represented by the doc key 146$a$. This means that if a query has a feature represented by the query key 144$a$, the base score of each of ads 124$a$ and 124$b$ is adjusted by a1. In some examples, the adjustment a1 can represent an odds multiplier, so that if the base score of the ads 124$a$ and 124$b$ are S1 and S2 respectively, the adjusted scores for documents 124$a$ and 124$b$ are S1*a1 and S2*a2, respectively. The adjustment can also include other functions.

If a query has multiple features represented by multiple query keys, each query key triggers adjustments to the base scores of a number of documents (in this example, ads). The final score for each document is determined by considering cumulative adjustments from the multiple query keys.

Using the odds model 110, for a given query, the information system 100 can quickly determine the base scores of all of the documents because only a small number of base scores need to be adjusted. In some examples, a query has a limited number of query features represented by a limited number of query keys, which link to a limited number of doc keys, which in turn link to a limited number of documents (ads). In these examples, for any given query, the number of documents whose base scores need to be adjusted is small relative to the total number of documents.

For example, an operator who designs the odds model 110 may initially identify hundreds of potential features of queries and ads in the training data set 124, and the model builder 118 analyzes the performance data to determine which query features and which ad features are useful in predicting performance. For example, the operator may initially identify query features X1 to X10 and ad features Y1 to Y10 to be potentially useful, and the model builder 118 after performing a machine learning process may determine that only query features X1, X3, and X9, and ad features Y2, Y4, and Y7 affect the performance.

Figure 3:
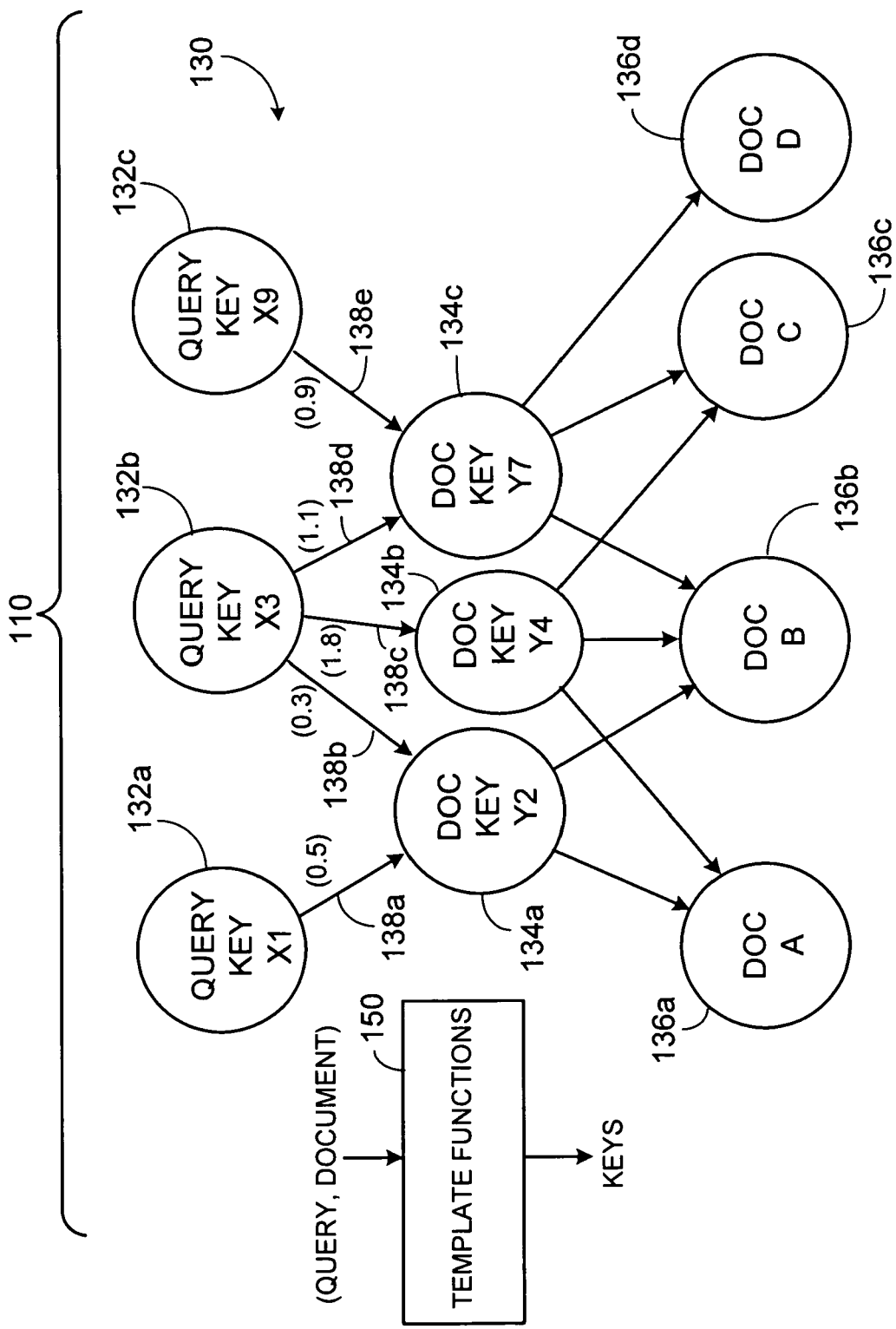
FIG. 3 is a diagram of an example odds model.

FIG. 3 shows a diagram of an example odds map 130 and a set of template functions 150 of an odds ranking model 110. The model builder 118 builds the odds map 130 and the set of template functions 150 by applying machine learning to the training data set 120, in which the odds model 110 models how the features X1, X3, X9, Y2, Y4, and Y7 affect the scores of the documents A, B, C, and D. In this example, the scores of the documents represent the performances of ads (e.g., odds that the ads will be clicked on, or the conversion rate of the ads). The query features X1, X3, and X9 are represented by query keys 132*a*, 132*b*, and 132*c*, respectively. The ad features Y2, Y4, and Y7 are represented by doc keys 134*a*, 134*b*, and 134*c*, respectively. For any pair of query and ad in the training data set 120, the performance can be predicted just by determining whether the query has the features X1, X3, and/or X9, whether the ad has the features Y2, Y4, and/or Y7, and calculating the effects of the features X1, X3, X9, Y2, Y4, and Y7 on the performance. Because the features X2, X4-X8, X10, Y1, Y3, Y5, Y6, and Y8-Y10 are irrelevant to the performance (as far as the training data set 120 is concerned), those features do not need to be analyzed to determine the performance.

In the example of FIG. 3, the query key X1 132*a* affects the doc key Y2 134*a*. The query key X3 132*b* affects the doc key Y2 134*a*, doc key Y4 134*b*, and doc key Y7 134*c*. The query key X9 132*c* affects the doc key Y7 134*c*. Document A 136*a* and document B 136*b* have the feature Y2. Document A 136*a*, document B 136*b*, and document C 136*c* have the feature Y4. Document B 136*b*, document C 136*c*, and document D 136*d* have the feature Y7. The adjustments for the link 138*a* from the query key X1 132*a* to the doc key Y2 134*a*, the link 138*b* from the query key X3 132*b* to the doe key Y2 134*a*, the link 138*c* from the query key X3 132*b* to the doc key Y4 134*b*, the link 138*d* from the query key X3 132*b* to the doe key Y7 134*c*, and the link 138*e* from the query key X9 132*c* to the doc key Y7 134*c* are 0.5, 0.3, 1.8, 1.1, and 0.9, respectively.

Suppose the system 100 receives a query and needs to select N ads having the highest scores. The system 100 uses the template functions 150 to determine that the query has features X1 and X3. The system 100 first calculates adjusted scores for the documents that are affected by the features X1 and X3. The base score of document A 136*a* is multiplied by 0.5 (the adjustment or odds multiplier for the link 138*a*), 0.3 (the adjustment for the link 138*b*), and 1.8 (the adjustment for the link 138*c*). The base score of document B 136*b* is multiplied by 0.5 (the adjustment for the link 138*a*), 0.3 (the adjustment for the link 138*b*), 1.8 (the adjustment for the link 138*c*), and 1.1 (the adjustment for the link 138*d*). The base score of document C 136*c* is multiplied by 1.8 (the adjustment for the link 138*c*) and 1.1 (the adjustment for the link 138*d*). The base score of document D 136*d* is multiplied by 1.1 (the adjustment for the link 138*d*) and 0.9 (the adjustment for the link 138*e*). The system 100 examines the adjusted scores of documents A, B, C, and D, and the base scores of other documents, and identifies N documents having the highest scores.

Using the odds map 130 and the set of template functions 150, the system 100 can, for any query, quickly determine the N (N being an integer) best ads from among all of the ads in the training data set 120. The system 100 extracts features from the query, identifies the query keys that correspond to the query features, identifies the doc keys that are affected by the query keys, and applies adjustments to the base scores of documents having features represented by the doc keys. The system 100 then finds the N ads having the highest scores. The N best ads determined using the odds model 130 are the same as the N best ads determined using a brute force method that applies the ranking function to every ad in the training data set 120 to determine the scores of every ad, then selects the N documents having the highest scores.

After the odds model 110 has been established using the training data set 120, the odds model 110 can be used to predict the scores of other ads in response to queries, in which the ads or queries may not necessarily be represented by the training data set 120.

The information system 100 logs information about queries that are received and ads 108 that are served in response to the queries, as well as the performances of the ads 108 that are served, in the database 116 (FIG. 1). The performance data can include, e.g., click-through rate and conversion rate. The model builder 118 uses machine learning techniques to update the odds model 110 to include information about the newly logged queries, ads 108, and performance data. The model builder 118 updates the base scores of ads in the odds model 110 and information about how certain features of the queries affect the base scores of ads having particular features, e.g., the adjustments. For example, the odds model 110 may be updated periodically, updated in response to an instruction from an operator, or when the number of new queries and ads received are above a threshold.

Building the initial odds ranking model 110, including calculating the base scores for the documents, can be performed off-line before receiving any new queries. During run time, when a query is received at the information system 100, the template functions are used to identify relevant features in the query, the query features are given to the odds ranking model 110 to determine how the base scores of the documents are adjusted to generate final scores for the documents. The system 100 selects a number of documents having the highest adjusted scores, and serve the documents in response to the query.

The following describes in more detail examples of methods for selecting the best N ads in response to a given query.

One way of determining the best N ads for a given query is to use "brute force" by calculating a score for every ad using a cost function and keeping track of the N ads having the highest scores. A more efficient way is to arrange an index data structure in such a way that the information system 100 does not have to consider every ad, and only calculate the scores for the ads that are likely to be the best ones. The auction function that determines a ranking score for each ad is dependent on both the ad and the query. In some examples, the auction function can be separated into two parts, the first part being dependent only on information associated with the ad (e.g., content of ad, bid for ad, landing page of ad, etc.), the second part being also dependent on the query. The first part of the auction function can be used to generate an index before any query is received, and the index can be used for ranking any query. When a query is received at a server, the selection process runs through the index and determines which ads are likely to have a high score, and calculates the exact scores based on the ads and the query only for the ads that are likely to have high scores. Because the exact scores only have to be calculated for a small set of ads, the server can select good ads very quickly.

In some implementations, the selection process uses a model that describes the probability that a user will click on an ad. This technique works for a specific class of models, and the results are perfect for that class of models. When a model belonging to the specific class of models is used, the selection process provides the same answer as using the brute force method. If an odds model X that does not belong to the specific class of models, another odds model in the specific class of models can be used to approximate the model X. The system 100 finds top M (M>N) ads quickly using the approximate model, and then for the top M ads determines the score exactly using the model X and finds the best N ads. For example, to find the top 10 ads, the system 100 can use the approximate model to find the best 100 ads, and then use the exact model to find the top 10 ads from among the 100 ads.

The best ads can be identified based on an auction function. In some examples, the auction function depends both on the quality of the ad (which affects the probability that users will click on the ad) and what an advertiser bids for the ad. An advertiser whose ad is not very good but bids very high may obtain the same position in the auction as another advertiser whose ad is very good but does not bid as high.

For every document, the information system 100 can compute a prior baseline probability, which is a baseline auction score that depends only on the document and its bid. The baseline score does not depend on the query. Information other than the bid amount, in which the information can be obtained prior to receiving a query, can also be incorporated in the model and used in calculating the baseline auction score.

A generic ranking function generates a score based on information about an ad and information about a query. The model that is used by the selection process belongs to a subset of the generic ranking functions, in which the models allow one to express the final score as a first function of the query only and a second function of the document only. For example, a model can specify that when the query is from California and the document is from an advertiser whose address is in California, the probability that someone will click on the ad is higher. This model depends only on information computed solely from an ad, and information computed solely from a query.

Below is an example of a model that depends on both the query and the ad: consider a model that specifies if the number of words in a query is longer than the number of words in the ad, then the ad is more likely to be clicked.

A feature can be extracted from a query without information about an ad, and a feature can be extracted from an ad without information about any queries. The model learns from looking at a combination of these two things in isolation. The index allows the system to pre-compute the relationships offline using the learning method.

The following are definitions of terms used in this description.

Document: The content associated with a single ad (e.g., the customer identifier, creative, and landing page associated with the ad).

Query: The content associated with a single ad request (e.g., the personal history of the user, the Internet Protocol (IP) address from which the request originated, and semantic word clusters of the content page where an ad is shown).

Feature template: A discrete function of an ad request and a document used for click-through prediction (e.g., query_unigram:customer_id).

Feature template key: An instantiated value for a given template (e.g., query_unigram="foo":customer_id=100).

Doc key: A feature template key whose value is a function of a document only (e.g. customer_id=1011).

Query key: A feature template key whose value is a function of a query only (e.g., query_unigram="inference").

Separable feature template: A feature template that can be expressed as a function of a query only, and a function of a document only; the value of a separable feature template can be computed by independently measuring a property of a document and a property of a query, but not both at the same time (e.g., query_fp:customer_id is a separable feature template).

Inseparable feature template: A feature template that requires measuring properties of both a document and a query simultaneously (e.g., the number of query terms that are also in the creative).

Ranking model: Any function that computes a partial-ordering of eligible documents given a query.

CoOccurance model: A ranking function based only on separable feature templates.

eCPM: Expected cost per impression (e.g., predicted_ctr*cpc).

The Odds Ranking Model

In some implementations, the system 100 uses a class of ranking models that are expressible as odds models. An odds model expresses the probability of an event in terms of a collection of adjustments to a prior odds of that event (e.g., for ads, the odds of interest are the (probability of a click/probability of no click)). For example, given a prior odds of 1.0 (i.e., click and no-click are equally likely), an odds model trained on historical ad click data may learn an adjustment rule of the form "ads in a different language than the query should have their click odds adjusted by 0.05" (e.g., it is less likely that someone will click on an ad in this case). The final probability of a click can be derived from the prior odds and the odds multipliers. In the examples described here, it is assumed that logistic regression is used as the underlying probabilistic model for the data. However, the model is not limited to using logistic regression.

In some implementations, an odds ranking model includes two parts. First, a set of template functions from (document, query)->discrete key. These template functions define how to convert a (document, query) pair to a collection of features used for prediction. For example, if one of the prediction features within our odds model is "one or more terms from the query appear in the ad title", then a sample template function may output this feature for the input AdTitle="roses at lowest prices" and Query="roses", but may not output it for AdTitle="New Year concert tickets" and Query="roses".

Second, the odds ranking model includes an odds map that maps keys to odds multipliers (or adjustments) representing odds multipliers for those features that have been learned by the model. Following the example above, the odds map may contain an entry of the form: "one or more terms from the query appear in the ad title"-->1.2. This means that (document, query) pairs that express this feature will have their click odds increased by about 20%.

In some implementations, predictions can be generated from a model as follows. Given a (document, query) pair, use the template functions for the model to generate the complete set of keys expressed by this pair. For each key, look up the associated odds for the key in the odds map. Compute a final probability from these odds using logistic regression.

In some examples, odds ranking models can be learned by analyzing historical log data (e.g., (document, query)->{click, no_click}), e.g., using methods such as maximum likelihood to estimate the model parameters.

For example, the goal of the systems is, given an odds ranking model and a large collection of documents (e.g., ads), efficiently rank the entire collection for a given query using the model.

For example, given a (document, query) pair, the system produces a set of query keys and a set of document keys and the system map odds for each of those keys. The system calculates an adjustment value to each of the keys. To rank any given ad, the system starts with a baseline score, which can be a prior score. The prior score takes into account the bid information or any information that can be computed based on the ad alone. The system extracts some attributes from the query, based on the odds model looks up the attributes to see how the attributes change the scores for all of the ads that have certain attributes, and applies the adjustments accordingly. For example, a query that contains a term X may affect documents that have the attribute Y and boost their scores by S1, and affect documents that have the attribute Z and lower their scores by S2.

For example, if the query is "New Year Concert at Madison Square", and the system extracts two features from this query, feature one and feature two that are attributes of the query only. Suppose feature one is that the query has three words, and feature two is that the query contains a bi-gram "New Year". Suppose there are two ads. Both ads have equal prior probability of being clicked, e.g., 1%. The bid on the first ad is 10 cents, and the bid on the second ad is 5 cents. Each of the ads also expresses a set of attributes. One attribute is whether the ad contains "New Year" in the title, and a second attribute is the length of the title.

In general, each document (e.g., ad) has attributes, and a function can be used to extract a set of attributes from a given query. The odds model is a way of mapping these document attributes and the query attributes into an adjustment value. For example, the odds model may indicate that when the query contains "New Year" attribute and the document contains "New Year" in the title attribute, the score is increased by some factor. When the query length is three and the ad title length is less than three, then the title is likely to be a bit more general than the query, so the score is reduced by some percentage.

In the example above, there are two ads that need to be ranked. The query generates the two attributes and the odds model has pre-computed the relationship between attributes of queries and how they change the scores of documents that have certain attributes. At run time, the system applies the odds model to the query and ads. For the given query, the system determines its attributes, looks up how each of the query attributes changes the scores of documents have certain attributes, then applies the changes to all the documents that contain those attributes. Once the changes are applied to all the ads, the system obtains a different score for each of the ads whose bases scores are affected, and ranks the ads based on the modified scores. The final score for each ad computed using the odds model is the same as the final score computed by a traditional ads selection system that uses a two-step selection process. The difference between the ad selection process described in this document and the traditional two-step method is that in the new method, the system does not have to consider every ad. The new method allows the system to, out of a very large group of ads, find the best ads more efficiently by not having to consider all of them.

The new ad selection process allows the system to avoid explicitly computing the score for every ad. The odds model looks at how attributes of the query change the scores of whole sets of ads. The learning models may have attributes that either affect a small number of ads, or a large number of ads. For example, there may be a model that learns to predict how features of the query adjust the scores for large collections of ads, such as ads with title lengths greater than three, which is a big set, and there may be 100,000 ads in the set. The model may learn that certain queries affect small sets of ads. For example, a specific ad for an auction site X may perform badly when shown on queries that contain the name of a web portal Z. There may be large collections of ads whose scores change in the same way. The system determines how the scores of whole sets of ads change, then ranks only the ads in the set that will get the highest final score.

In the traditional two-step ad selection process, suppose there are one million ads in the ads pool, a matching algorithm is applied to match the keywords of the ads to the keywords of the query and select, e.g., 100,000 candidate ads. Among those 100,000 candidate ads, the scores are calculated using an auction function and the top, e.g., 100, ads having the highest scores are selected. Because advertisers may not necessarily know which queries users are going to send, and which keywords would best match those queries, there may be ads in the ads pool that are really good for certain queries but are not selected through the two-step ad selection process because the advertisers did not select the proper keywords.

One advantage of the new ad selection process is that it can be used for keywordless ad targeting. Advertisers can just provide ads without choosing keywords, and the system using the new ad selection process will decide where the ads may be useful to target based on attributes extracted from the ads (e.g., from the ad creative). Using the new ad selection process, the ad is eligible to be shown on every query and ranked based on the auction function, compared to the traditional system where the ad is only eligible to be shown on queries where the advertiser foresaw that particular queries are good for the ad and explicitly chose keywords ahead of time to target the particular queries.

Two techniques can be used when applying the odds model to select ads. The first technique is to use the odds model to determine how attributes change the scores of whole sets of ads. These sets may overlap in some way. The second technique is to pre-partition the ads into sets that do not overlap, and determine how attributes change the scores of the various non-overlapping sets of ads. For example, out of a million ads, there may be 500,000 ads that have titles of length=2, and 500,000 that have titles of length=3. Suppose an odds model indicates that when the query has the attribute "New Year", if the title has length=3, the ad gets a lower score, and if the title has length=2, the ad gets a higher score. If the document attribute sets are organized in such a way that the sets do not overlap, every document appears in exactly one set. To use an analogy, all of the ads can be classified into several "buckets", and each ad belongs to exactly one bucket. The odds model provides information about the relationship between attributes of the query and how that attribute of the query changes the scores in each bucket.

In the above example, one bucket is for ads having titles of length 2, and one bucket is for ads having titles of length 3, and the two buckets are mutually exclusive. The ads in each of these two buckets can be ordered in such a way that within each bucket the prior scores are descending. The ads in each bucket that have the highest prior probability of a click times their bid occur first. As the ads in a bucket are examined in sequence, the score is decreasing. For a given query attribute, the system can see how all the buckets change, look at the scores in descending order, and stop when all of the ads that are needed (the top N ads) are obtained. By having these buckets and having this learning model that has this particular form, the system can search for ads in an order where the earlier ads are guaranteed to have higher scores than the later ones.

For example, suppose there are ads that have title length 2 and ads that have title length 3. The ads are sorted into bins, and in each bin the ads are sorted in descending prior score order. For a given query, the odds model may indicate that the ads in bin one will get a boost of 1.2 and the ads in bin two will get a demotion of 0.5. The system can go down the lists of ads in each bin and compute their final scores.

In the description below, there are three examples of ad selection methods. The first example uses brute force. In the second example, the non-overlapping bins are not used. In the second example, the ads are separated into groups, and within each group the ads are sorted according to their baseline scores. When an algorithm is applied for extracting attributes from the query and the attributes are applied in order to modify the scores of the ads, for each separate bin the way that the rank scores are modified (e.g., increased or decreased) is the same, so the system can go to the highest ranking ads and apply the changes. In the second example, the system separates properties of the documents from properties of the queries in such a way that the system can compute scores for large numbers of ads more quickly than brute force.

In the second example, suppose there are one million ads that are not separated into non-overlapping bins. For a given query with certain attributes, the adjustments are applied to the one million ads, because the ads are not sorted into bins, the scores for some ads are boosted, and the scores for other ads are demoted. As a result, there is a possibility that a lower scoring ad may be boosted to a higher position than a previously higher-scored ad that has been demoted. The system generates an index structure to help determine when to stop calculating the exact scores for the lower scoring ads to reduce the number of calculations. For example, the system may consider to adjust the scores of ads if the ads appear in the first P (P being an integer) entries in the lists in the index structure.

The third example assumes there are bins (or partitions) that do not overlap. The third example is faster that the first and second examples, but may require certain limitations on the class of models that are used.

As described above, the odds model is a predictive model that has historical information about whether certain queries have been clicked and what the results were. The system uses the odds model to try to predict for a new query and a new ad the probability of it being clicked. The odds model captures historical data to learn and apply to new situations. In the second example, when given a query, the system can determine the best ads in a large set that are most likely to get the best results for that query. The system can do that in such a way that the set can be quite large and the result can be returned quite efficiently.

In the brute force method, the baseline score is calculated for every ad. The learning model looks at the history of all ads and tries to estimate for a given ad, without seeing the query, whether it is a good ad, e.g., what the probability is that it will be clicked. In the second example, the system separates the model being applied in the first example (brute force method) into two parts in such a way to make it more efficient to evaluate every ad as a candidate.

In both the first and second examples, one tries to find the best ads in, e.g., one million ads. In the first method, for a given query, a predictor is applied sequentially to all the ads. In the second method, the predictor is separated in two parts and a transformation is applied to transform it into a different kind of predictor, such that the new predictor provides information about which ones are the best ads without the need to apply the new predictor to every ad.

Brute Force Method

The following is an example listing of pseudo code that can be used to implement a "brute force" method that ranks every ad. This example can be used as a baseline for evaluating other methods.

GetCandidates(query, num_candidates, TemplateFunctions, OddsMap):
1. For each servable document d:
   Compute all the keys {k} for this (document, query) pair using the template functions for the current model.
   TempOdds=1.0
   For each key k in the set above:
     TempOdds*=OddsMap[k]
   Push the (TempOdds, document) pair onto a priority queue of max size K
2. Return the top K documents by final odds.

The Separable Odds Machine

This section describes an example illustrating the construction and use of an odds ranking model referred to as a "highroller model". In this example, bidding is not taken into account, and a large collection of ads are ranked by predicted click-through rate (CTR) only. It is assumed that each document in this example has the same prior odds.

In this example, the highroller model is a ranking model whose template functions are all separable. A separable template function is based on a measurement that is made on the query only, and an independent measurement made on a document only. For example, "the query is from Canada" is a separable query feature, while "the document has a high spam score" is a separable document feature. Thus, the template function combining these features is a separable template function.

Given as input an odds ranking model that has been trained over historical data, an index is constructed using the method below. It is assumed that one can determine the appropriate template function for a given key, as well as the constituent doc key and query key components of any template function.

BuildHighrollerGraph(TemplateFunctions, OddsMap, ServableDocumentSet):
1. Create two maps: the QueryMap {QueryKey->{(DocKey, Odds)}}, and the DocMap {DocKey->{Document}}, initially empty.
2. For each entry (Key k, Odds o) in the Odds Map:
   Since the Template Function that generated k is separable, k can be expressed as a (Doc Key=dk, Query Key=qk) pair.
   Insert (qk, (dk, o)) into the Query Map. If dk is already present, multiply its current map value by o.
3. For each Document d in ServableDocumentSet:
   For each Template Function tf in TemplateFunctions:
     Generate the set of Doc Keys expressed by d under
     For each Key k in this set:
       Since k was generated by a separable function, it can be expressed as a (Doc Key=dk, Query Key=qk) pair.
       Insert (dk, d) into the Doc Map.

4. Return (QueryMap, DocMap)

The resulting index can be represented as a tri-partite graph or odds map 140 of FIG. 2. The odds map 140 shows query keys that are linked to document keys, which in turn are linked to documents. Because the ranking model is fully separable, every key in the odds map can be expressed as a (DocKey, QueryKey) pair. This represents the upper part of the graph. Because the model is separable, given a set of documents to be ranked, the system can pre-compute the relationship between all documents and the doc-keys they express, and link these relationships to the odds model as shown. For example, if the ranking model has only one template function (query_fp:customer_id), the system can pre-compute the lower portion of this graph by linking every document to its customer ID key. In some examples, a given document can be pointed to by more than one (Doc Key, Odds) pair.

A query key 144 in the graph 140 represents an attribute of a query, such as "the query has 4 terms" or "the query has been classified as commercial". A doc key 146 in the graph 140 represents an attribute of one or more documents, such as "documents that are in English" or "the document with ID 10243455". The relationships between the query keys 144 and the doc keys 146 represent the model that has been learned over historical data. For example, "when the query has 4 terms and the document is in English, the odds of a click should be multiplied by 1.1".

Given this index, the system can collect the top K predicted CTR candidates for a given query. The following is an example listing of pseudo code for doing this:

GetCandidates(query, num_candidates, HighrollerGraph):
 1. Assume every servable Document d has an index di in a dense range [0, num_servable_docs) that uniquely identifies the document; this is convenient but not essential.
 2. Initialize a map of working_odds (length=num total servable documents) such that working_odds[i]=1.0.
 3. Compute all the QueryKeys {qk} for the Query using the Template Functions for the current model.
 4. For each QueryKey qk:
    For each (DocKey dk, Odds o) node neighboring qk:
        For each Document d with index di neighboring dk:
            Update working_odds[di]*=o
 5. Traverse the working_odds array, collecting the top K documents in a priority queue.
 6. Return the top K documents from this queue.

Odds Iterators

Figure 4:
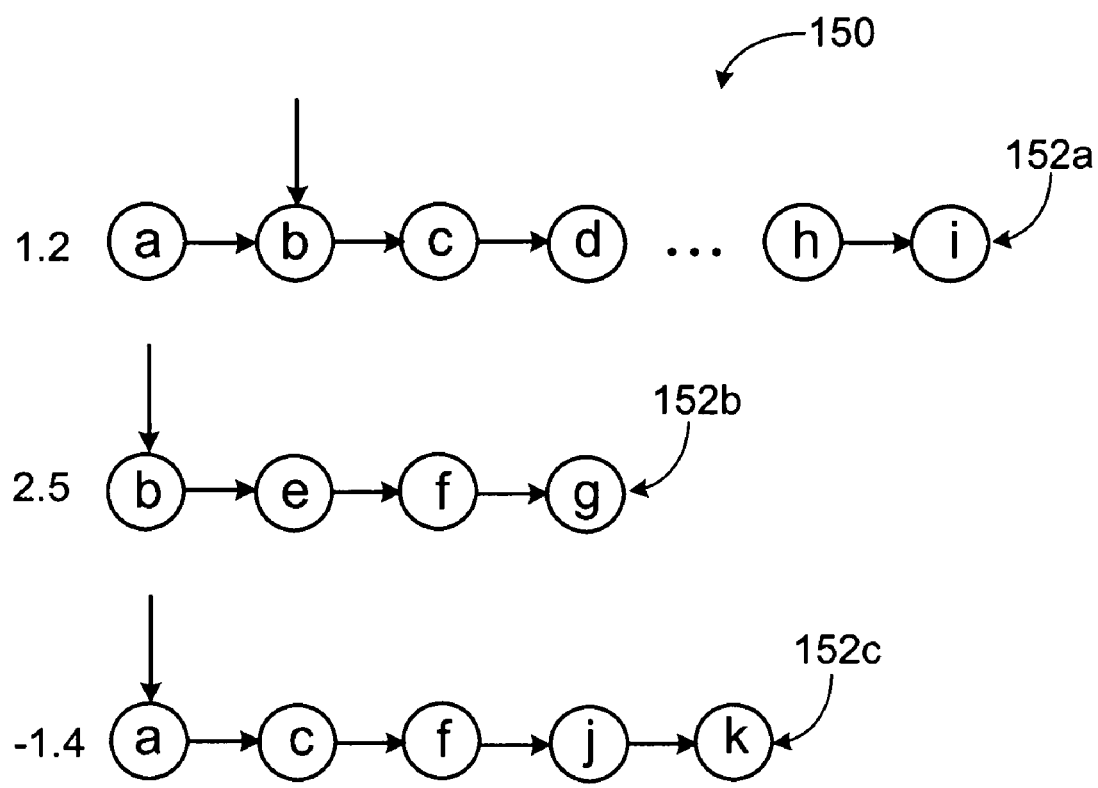
FIG. 4 is a diagram of an index structure.

In some implementations, one useful data structure for highroller serving (i.e., serving of documents or ads using the highroller odds model) is the interleaving odds iterator, shown in an index structure 150 in FIG. 4. The index structure 150 includes K lists (e.g., 152a, 152b, 152c, collectively referred to as 152) whose elements are document identifiers sorted in ascending order by doc id. Note that a given document id may appear in zero or more lists. Associated with each list is a working_odds multiplier. This odds multiplier applies to all documents in the list. The following is a listing of pseudo code of an iterator that, given a set of lists, generates a series of (document ID, posterior odds) pairs in ascending order by document ID:

NextDocOddsPair (doc_lists [ ], current_list_position [ ]):
 1. // Determine the next smallest doc id across all lists:
 2. smallest_doc_id=UNKNOWN
 3. For each i in range(0, current_list_position.length):
    If doc_lists[i][current_list_position[i]]
        doc_id<smallest_doc_id:
        smallest_doc_id=doc_lists[i][current_list_position[i]].doc_id
 4. // Compute the posterior odds for the smallest doc and advance iterators:
 5. posterior_odds=1.0
 6. For each i in range(0, current_list_position.length):
    If doc_lists[i][current_list_position[i]]==smallest_doc_id:
        posterior_odds*=doc_lists[i].working_odds*doc_lists[i][current_list_position[i]].odds
        ++current_list_position[i]
 7. Return (smallest_doc_id, posterior_odds)

Note that the data structures resemble "posting lists", in which each posting list has a single weight. We are interested in finding documents that maximize a function of their weights in each list.

This data structure is used in highroller serving as follows. Given a query, the system 100 computes the set of query keys qk that are active for that query, and from these query keys, the set of active (Doc Key=dk, Odds=o) pairs. As shown in the tripartite graph diagram 140 of FIG. 2, a Doc Key dk maps to a list of individual documents that express that key. The interleaving odds iterator structure is generated by collecting all active Doc Key lists for a given query. The working_odds associated with each list is the odds multiplier o associated with the DocKey that was activated. Once the iterator is constructed, we iterate using the method above, pushing docs onto a priority queue as they are returned, collecting the top K documents by posterior_odds. Additional special cases can be handled to deal with prior_odds properly (e.g., the best document may be one whose posterior_odds=prior_odds).

The algorithm above improves efficiency when there are a large number of documents because it is not necessary to consider every document to find the best K documents by posterior odds (e.g., the step where the system traverses the working_odds array in the previous algorithm can be skipped because the system can apply all the odds for a given document at the same time).

Partitioned Odds Iterators

In some implementations, when using interleaving odds iterators, they are completely traversed in order to guarantee correctness. If a given document is present in at most one list, and each list is sorted by prior odds, instead of by doc id, then it is possible to efficiently iterate over all docs in descending order of posterior odds. The system can ignore a large numbers of documents and therefore serve much faster. Specifically, the system calls the NextDocOddsPair ( ) method above K times, where K is the number of documents that needs to be returned. Once the system has fetched the K documents, the system knows that all remaining documents have posterior odds lower than these K documents, so does not need to continue to traverse the lists.

In some implementations, one of the steps in the construction of partitioned iterators is to find a transformation that can be applied to the doc keys in a highroller index. We want the transformed index to have the property that every document appears under exactly one doc key. If such a transformation can be found, the system can iterate over documents in order of descending posterior odds, and thus process only the best documents.

As an example, let the query keys be query length (with values 1, 2, and 3) and query language (with values English, Spanish, and Chinese). A given query will fall into one of 9 possible classes based on these query keys. Let the Doc Keys be document language (with values English, Spanish, and Chinese), customer ID (with values 0, 1, and 2) and ad cluster (with values 0, 1 and 2). A given document will fall into one of 27 possible classes based on these three document keys. Suppose there are about one million ads under each document key value (e.g., one million English ads, one million ads for customer ID 0, etc.), and about three million ads in total.

Suppose the odds model learned that English queries for customer 0 boosted click-through by 1.2, and 3 term queries in ad cluster 1 lowered the click-through rate by 0.6. For a 3-term English query, both of these rules would trigger, causing the highroller serving process to fetch the doc key lists for customer 0 and ad cluster 1. To determine the best ads for this query using interleaving iterators, in the worst case, the system traverses the entire set of approximately one million ads in each of these lists.

However, suppose our doc keys are transformed into partitions as described above. One way in which this can be done is to make each new doc key a fully-defined vector of values over the old keys. For example, a new doc key in our example index can be [ad language=English, customer_id=0, ad_cluster_id=2]. Whereas in the original index, there are 9 doc key posting lists (3 for language, 3 for customer, 3 for ad cluster), in the transformed index, there are 27 doc keys, one for each vector value over the original doc keys. The transformed doc keys have the following property: a given document in the index appears in exactly one doc key posting list.

Note that if every possible combination of document key values contains documents, then this method may not be useful because in the worst case, there is a different doc key for every document, and we may be transforming a single posting list of one million in length into one million posting lists of length one.

In some examples, this worst case does not happen for three reasons. The total growth in the number of doc key posting lists is less than the worst-case combinatorial prediction. First, odds models are designed to generalize over the documents. Thus, by design, the model will include keys that cover many ads, which means the smallest partitions generally contain several documents. Second, the collection of documents can be, e.g., sparse in the document key vector space. For example, a given customer is likely to have ads in only one language, which reduces the total number of possible partitions by a factor. Third, odds models can be trained on significantly less data than is statistically required to distinguish all possible documents from each other under the model. We have seen significant collections of documents that are equivalent to each other under the trained odds model (e.g., any two ads in this collection get the same predicted CTR for any input query). The combination of these facts, which arise because our input is a model that has been designed to generalize and trained on a finite sample of historical data, makes it possible to rank large collections of documents under the model much more efficiently.

If the transformed doc key posting lists are sorted in descending order by prior odds, then the system can compute the best documents for a fully partitioned index using the following method. It is assumed that the doc keys have been transformed as described above.

GetCandidatesUsingPartitions (query, num_candidates, HighrollerGraph):
1. Compute all the QueryKeys {qk} for the Query using the Template Functions for the current model.
2. For each QueryKey qk:
    Collect each (DocKey dk, Odds o) node neighboring qk into a map from DocKey->(odds_update, doc_list, index). Doc_list is the list of documents under DocKey, sorted in descending order by prior odds. Index is initialized to 0, and represents the current iterator position for the given doc key list. odds_update is the total odds update for dk under all QueryKeys qk.
3. Until we have num_candidates ads:
    Set best_odds=0, best_document=NULL, best_doc_key=NULL
    For each DocKey dk in the map:
        Compute the posterior odds of the document at index as posterior_odds=odds_update*prior_odds. Note again that a given document will appear in at most one doc_list, and thus it's final odds update
        If the posterior odds for this document is larger than best_odds, set best_document=document, best_odds=posterior_odds, best_doc_key=dk.
    Add (best_document, best_odds) to the list of candidates to return.
    Advance index for best_doc_key to index+1.

Using a heap to manage the partitions can improve the efficiency when large numbers of lists are being processed.

The following describes three methods (equivalent docs, longest list remainders, and generalized partitions with remainders), for determining how the partitions are constructed. Three methods are described in addition to the exhaustive vector-enumeration technique mentioned above.

Below is a description of the "equivalent docs" method. One partitioning method divides the set of all documents such that Di and Dj were in the same partition if and only if Di and Dj always received the same working_odds update on every query (e.g., every path through the highroller graph assigns the same odds to Di and Dj). In some examples, this method produces partitions that can be quite large (e.g., the total number of partitions is much smaller than the total number of documents). The reason seems to be that the models are trained on an amount of data that is very small compared to the total number of unique rankings over all ads, so the data and model are insufficient to distinguish every unique document from every other document. Equivalent document partitioning is attractive because the partitions can be computed efficiently in a single-pass over the highroller graph using ordered fingerprints.

Below is a description of the "longest list remainders" method. Because the latency of serving is determined by the longest lists that need to be traversed, and empirical measurements suggest that the index contains a few very long lists and many small and medium sized ones, we can compute partitions only for Doc Key lists longer than a given size. We maintain both a partitioned iterator for the long posting lists (which we can traverse fast), and an interleaving iterator for the rest of the lists (which can also be traversed quickly since they are relatively short). This method uses careful bookkeeping for cases where a document appears in both the partitioned and interleaving iterators.

Below is a description of the "generalized partitions with remainders" method. The methods described above can be viewed as compression techniques: given a highroller graph, we want to encode the graph in such a way to minimize the length of the longest list that has to be traversed in serving, while preserving the posterior odds for every document under every query. Seen this way, we can define a general method for constructing an optimized index from a highroller graph model as follows.

A highroller graph is effectively a set of lists of the form {QueryKey->(doc_id, odds)}. This set can be generated by flattening the graph into two levels. We want to construct a set of partitions to minimize the total number of bits required to transmit this set. Given two disjoint sets of DocIDs (Di, Dj) and a single list from the model described above, the compression score can be defined as follows:

MergeScore (pi_docs, pj_docs[ ], doc_odds_map [ ]):
1. score=len(doc_odds_map)

2. For each pi in pi_docs:
   For each pj in pj_docs:
      if (pi,pj) are both in doc_odds_map.keys( ) and doc_odds_map[pi]==doc_odds_map[pj]:
         score-=1
      else:
         score+=1
3. Return score This score represents the length of the doc_odds_map that can be achieved if the documents in Pi and the documents in Pj are treated as a common symbol. For example, suppose the doc_odds list is {(1, 1.0), (2, 1.0), (3, 1.0)}, and the partitions are P1={1, 2} and P2={3}. Then if P1 and P2 are merged into P3, the score is 1 and the final doc_odds list can be re-encoded as {(P3, 1.0)}. The result is a shorter list, which can be traversed more quickly using a partitioned iterator.

Suppose the set of partitions is initialized to be the set of all documents (e.g., every document is its own partition). For every pair of partitions, we want to compute a total compression score by computing the effect of merging Pi and Pj on the total size of the index. For example, if the documents in Pi and Pj are equivalent docs (e.g., the documents in each partition have odds that are the same under the model), the compression can be maximized since Pi and Pj can be merged into a common symbol in every posting list. However, there will be examples where under some lists in the model, Pi and Pj receive different odds updates. In this case we encode the difference as a remainder odds. For example, suppose the doc_odds list is {(1, 1.0), (2, 1.0), (3, 2.0)}, and P1={1, 2}, and P2={3}. If P1 and P2 are merged into P3, the doc_odds list is re-encoded as: {(P3, 1.0)} and a remainder list {(3, 2.0)}. The method is iterated until no further compression in the index is possible.

Generalized partitioning can capture both the properties of equivalent ads and remainder partitions in one algorithm, and does not require an arbitrary definition of what constitutes a long list. While the computational complexity of the simple algorithm described above can be high, the simple "choose lists longer than size K to partition" heuristic works very well and generalized partitioning may produce the fastest servable indices.

Approximation Methods

In some implementations, it may be possible to serve an auction faster if we are willing to tolerate some error in the final CTR estimate. For example, if we can serve 50% faster by accepting a CTR error of about 1%, that may be a tradeoff worth making. It may be possible to quantize the odds in the index to a codebook of size K. As K goes to 1, the number of distinct partitions goes to 1 (e.g., every document gets the same odds), the error is large, and the serving is fast.

Inseparable Models

In the discussion above, we have considered separable models. One way to handle generalized non-separable features is to use a secondary backend system to compute the non-separable features for a subset of "likely to be good" candidates, and then blend the odds associated with these features into the general odds calculation. The generic backend for computing the non-separable features can be specified as follows:

AbstractCandidateSelector:
   Given: A Query (Q) and number of candidates (N)
   Return: A list of CandidateHints, length N. A candidate hint consists of a unique document id and a list of one or more arbitrary values (e.g. a score, a list of the terms that match both the query and the doc, etc).

The new pipeline passes every query to the AbstractCandidateSelector with a value of N that can be less than the total number of documents. The resulting candidates are then passed in as "hints" to the highroller serving algorithm roughly as follows: the difference between this method and the simple separable algorithm is in steps 5 and 6 below (more efficient implementations are possible):

GetBlendedCandidates (query, num_candidates, candidate_hints):
1. Initialize an array of working_odds and an array of scoreable_documents such that the current odds for scoreable_documents[i]=working_odds[i].
2. Compute all the QueryKeys relevant for the query.
3. For each QueryKey qk:
4. For each (DocKey dk, Odds o) node neighboring qk:
   For each Document d neighboring dk:
      Update working_odds[d]*=o
5. For each candidate C=(Document d, FeatureList fl):
   For each Feature f in fl:
      Lookup the odds for feature fl in a raw map containing only the non-separable portion of the complete smartass model. Call this odds o'.
      Update working_odds[index(d)]*=o'
6. For every Document d NOT present in the candidate_hints list:
   working_odds[index(d)]*=prior_odds
7. Traverse the working_odds array, collecting the top K documents in a priority queue.
8. Return the docs associated with these top odds.

Bootstrapping

One potential problem with a learning-based approach in a complex domain is that the dimensionality of the underlying parameter space can be large such that training from scratch using random sampling can be expensive. Conversely, there may not be enough data to fully distinguish documents from each other. This appears to be one of the properties that make it possible to serve efficiently (compare with equivalent documents above). In the domains considered here, there are numerous signals that can be used to constrain the set of eligible documents in some reasonable way. Often, such heuristics are non-separable functions of both the query and the document (e.g., a relevance score between the query and the title of a web page).

Consider two extremes. On the one hand, separating the selection of candidates from the learning system that ranks them can be non-optimal for the reasons discussed above. On the other hand, relying purely on a learnable ranking function can be impractical for some cases because there is not enough data to learn all the important distinctions. We may be able to consider external signals such as relevance scores and n-gram scores as prior knowledge and capture them in an odds-multiplier learned like any other feature.

A related idea is to use highroller methods to explore the space of possible candidates using reinforcement learning. Many ads appear to be identical to each other under a given model. A general theme in reinforcement learning is that greedy selection is rarely the best way to maximize cumulative return over time. Methods that balance greedy with some form of exploration of the space often perform better over time. Since highroller can be used to efficiently rank a large selection of ads, it can be used in a serving system where ranking is a non-deterministic function of both eCPM and, e.g., the number of ads sharing the same prediction keys, or some other measure that may increase the diversity of ads being shown.

Figure 5:
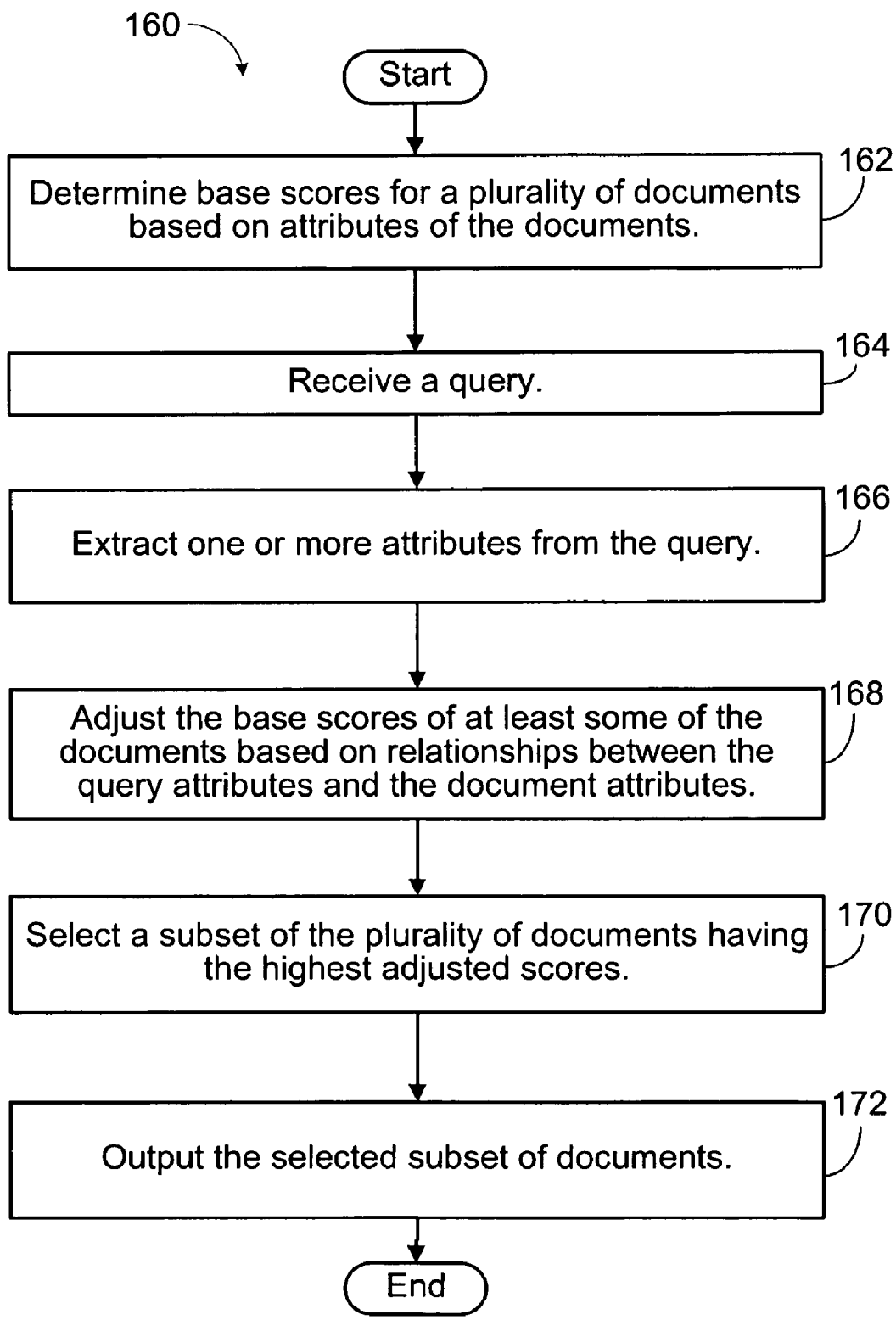
FIGS. 5 and 6 are flow diagrams of example processes.

FIG. 5 is a flow diagram of an example process 160 for identifying a subset of highest ranking documents in response to a query for documents. For example, the process 160 can be implemented by the information system 100 of FIG. 1. The documents can be, e.g., ads 108. In the process 160, base scores for a plurality of documents are determined based on attributes of the documents (162). For example, the attributes can include the language of the documents and the keywords in the documents. A query is received (164). For example, the query can be a request for ads. One or more attributes are extracted from the query (166). For example, the attributes can be the language in which the query is written, the context of the query (e.g., the web page where the document is to be shown), and the geographical location from which the query was sent. The base scores of at least some of the documents are adjusted based on relationships between the query attributes and the document attributes (168). For example, the odds multipliers can be used to adjust the base scores of the documents. A subset of the plurality of documents having the highest adjusted scores are selected (170). The selected subset of documents are output (172).

Figure 6:
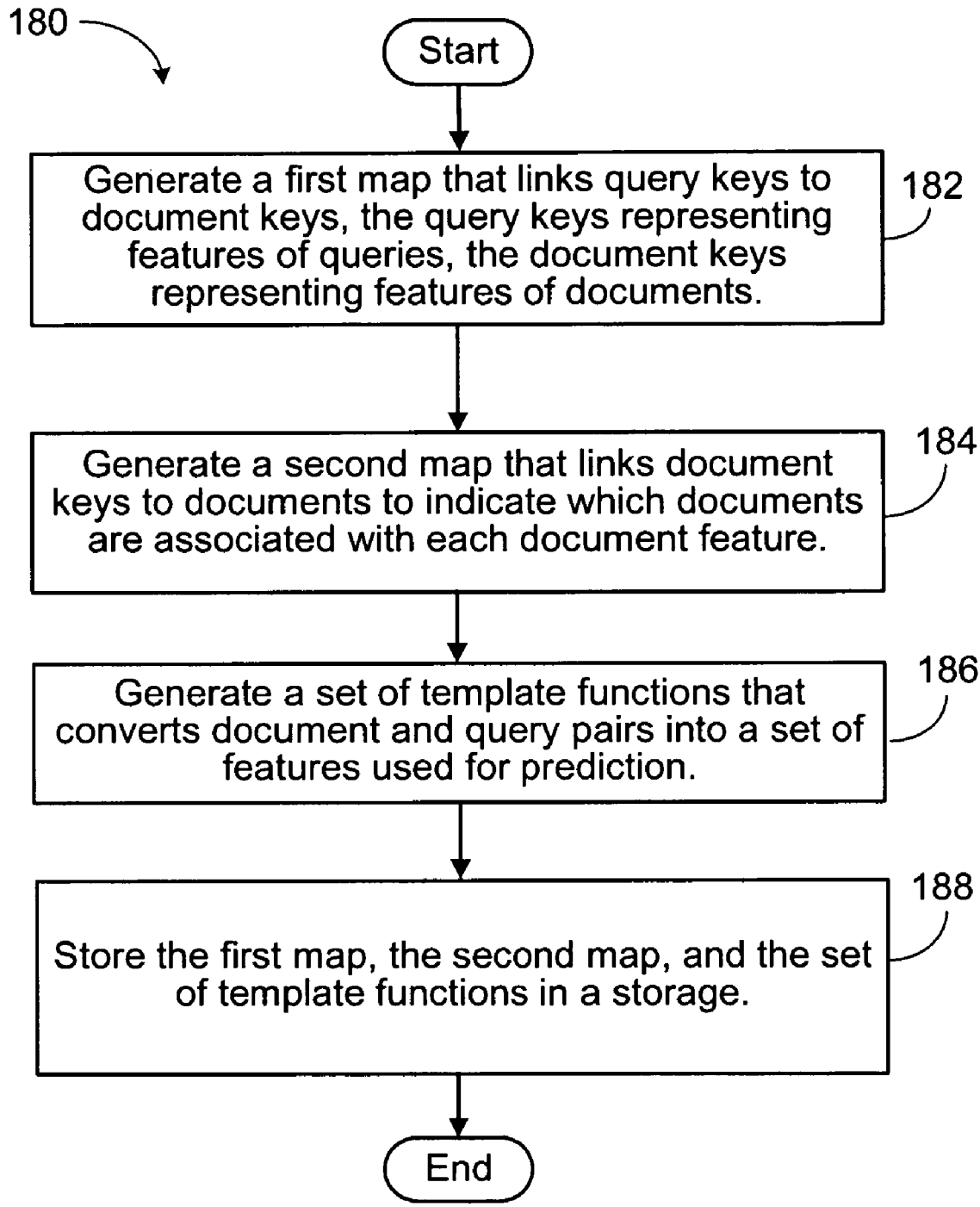

FIG. 6 is a flow diagram of an example process 180 for establishing an odds ranking model. For example, the process 180 can be implemented by the model builder 118 of FIG. 1. The documents can be, e.g., ads 108. The process 180 generates a first map that links query keys to document keys, the query keys representing features of queries, the document keys representing features of documents (182). A second map that links document keys to documents is generated to indicate which documents are associated with each document feature (184). A set of template functions that converts document and query pairs into a set of features used for prediction are generated (186). The first map, the second map, and the set of template functions are stored in a storage (188). For example, the first map, the second map, and the set of template functions can be the basis of the odds model 110 that is used to select the highest ranking ads in request to a query for ads.

Figure 7:
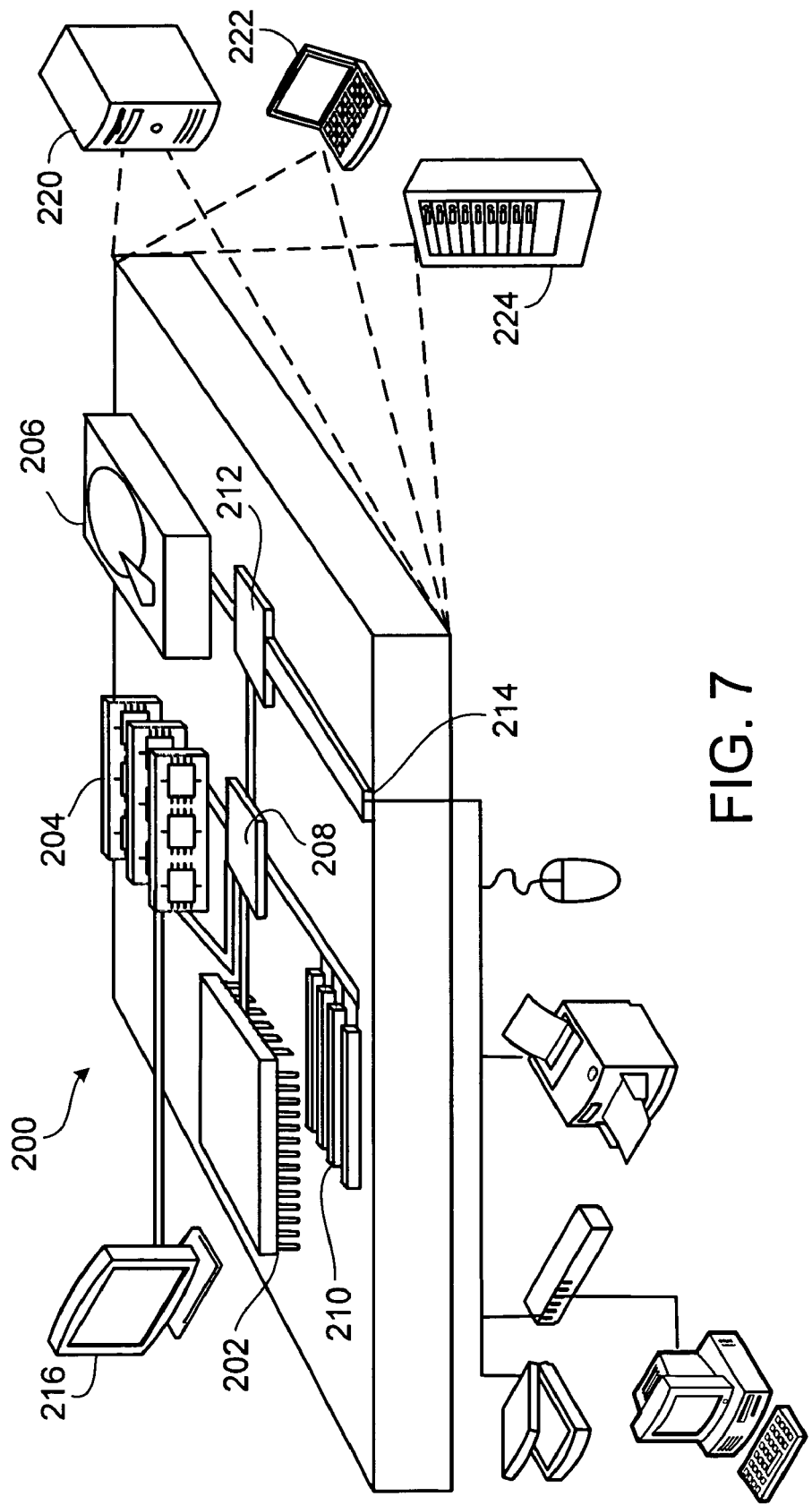
FIG. 7 is a schematic representation of a general computing system.
Like reference numbers and designations in the various drawings indicate like elements.

FIG. 7 is a schematic representation of a general computing system 200 that can be used to implement the information system 100. Computing device 200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 200 includes a processor 202, memory 204, a storage device 306, a high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various busses, and may be mounted on a common motherboard or in other manners as appropriate. The processor 202 can process instructions for execution within the computing device 200, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

The memory 204 stores information within the computing device 200. In one implementation, the memory 204 is a volatile memory unit or units. In another implementation, the memory 204 is a non-volatile memory unit or units. The memory 204 may also be another form of computer-readable medium, such as a magnetic or optical disk.

The storage device 206 is capable of providing mass storage for the computing device 200. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

The high speed controller 208 manages bandwidth-intensive operations for the computing device 200, while the low speed controller 212 manages lower bandwidth-intensive operations. Such allocation of functions is exemplary only. In one implementation, the high-speed controller 208 is coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200 may be implemented in a number of different forms, as shown in the figure. For example, it may be implemented as a standard server 220, or multiple times in a group of such servers. It may also be implemented as part of a rack server system 224. In addition, it may be implemented in a personal computer such as a laptop computer 222. Each of such devices (e.g., standard server, rack server system, personal computer, and laptop computer) may contain one or more of computing device 200, and an entire system may be made up of multiple computing devices 200 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described, other implementations can also be used. For example, various forms of the flows shown above may be used, with steps re-ordered, added, or removed. In certain implementations, multitasking and parallel processing may be advantageous. Also, although several implementations and methods have been described, it should be recognized that numerous other implementations are contemplated.

For example, the features of queries and features of documents can be different from those described above. The structure of the odds map and index can be different from those shown in FIGS. 2-4.

What is claimed is:

1. A computer-implemented method comprising:
   determining base scores for a plurality of content items based on attributes of the content items;
   receiving a query;
   deriving one or more attributes from the query;
   adjusting the base scores of at least some of the content items based on relationships between the query attributes and the content item attributes, the adjustments to the base scores determined at least in part according to a model that includes a first mapping relationship that maps query keys to content item keys and a second mapping relationship that maps content item keys to content items, the query keys representing features of queries and the content item keys representing features of content items;
   selecting a subset of the plurality of content items having the highest adjusted scores; and
   outputting the selected subset of content items.

2. The method of claim 1 in which the content items comprise ads.

3. The method of claim 1 in which the content items comprise documents.

4. The method of claim 2 in which the query comprises a request for ads, and the subset of ads are selected without matching ad keywords with query keywords.

5. The method of claim 2 in which the attributes of the query comprises a property of at least one of (a) one or more keywords of a search query, or (b) a web page on which an ad is to be displayed.

6. The method of claim 1 in which the base scores are determined prior to receiving the query.

7. The method of claim 1, comprising generating an index structure in which the content items are arranged in lists, and within each list the content items are sorted according to the base scores.

8. The method of claim 7 in which the index structure comprises multiple lists, each list being associated with a corresponding content item attribute and including content items having the corresponding attribute.

9. The method of claim 8, further comprising transforming the index structure to generate a transformed index structure such that each content item appears in only one of the lists in the transformed index structure.

10. The method of claim 9 in which selecting a subset of the plurality of content items having the highest adjusted scores comprises using the transformed index structure to select the subset of the plurality of content items having the highest adjusted scores.

11. The method of claim 7 in which adjusting the scores of at least some of the content items comprises adjusting the scores of some of the content items having higher scores in the lists and not adjusting the scores of some of the content items having lower scores in the lists.

12. The method of claim 1 in which the model comprises an odds model.

13. The method of claim 12, further comprising updating the odds model to include information about new content items, and using the updated odds model to select a number of content items having highest adjusted scores in response to a second query.

14. The method of claim 12 in which the odds model comprises an odds map representing the first and second mapping relationships.

15. The method of claim 12 in which the odds model comprises a template function to convert a query and content item pair to a collection of features used for prediction.

16. The method of claim 1 in which adjusting the scores of at least some of the content items comprises determining which content item attributes are affected by the attributes of the received query, and adjusting the scores of the content items whose attributes are affected by the attributes of the received query.

17. A computer-implemented method comprising:
   generating a first map that links query keys to content item keys, the query keys representing features of queries, the content item keys representing features of content items;
   generating a second map that links content item keys to content items to indicate which content items are associated with each content item feature; and
   storing the first and second maps in a storage.

18. The method of claim 17, further comprising generating a set of template functions that converts content item and query pairs into a set of features used for prediction.

19. The method of claim 18, further comprising receiving a query, extracting features from the query using the template function, determining scores for a plurality of the content items based on the features of the query, the first map, and the second map, and outputting a subset of the content items having the highest scores.

20. The method of claim 17 in which the content items comprise ads.

21. The method of claim 17 in which the content items comprise documents.

22. A computer-implemented method comprising:
receiving a query,
identifying a subset of content items having highest scores among a set of content items based on information about features of the query, a first predetermined mapping relationship between query features and content item features, and a second predetermined mapping relationship between content item features and content items, by computing adjustments to pre-computed baseline scores for content items having features that are affected by the features of the received query according to the first and second mapping relationships; and
outputting the subset of content items having the highest scores.

23. The method of claim 22 in which the content items comprise ads.

24. The method of claim 22 in which the content items comprise documents.

25. A computer-implemented method comprising:
training an odds model over a training set of queries and content items, the odds model comprising a query map that has information about how features of queries affect features of content items, each query feature being associated with one or more content item features, and a content item map that has information about which content items in the training set of content items are associated with each content item feature; and
outputting the odds model.

26. The method of claim 25, comprising receiving a query and using the odds model to select a subset of content items having highest scores from among a set of content items in response to the query.

27. The method of claim 25 in which the content items comprise documents.

28. A computer-implemented method comprising:
receiving a query,
identifying a first subset of content items having highest approximate scores among a set of content items based on information about features of the query and an approximate odds model, the approximate odds model comprising a first predetermined mapping relationship between query features and content item features, and a second predetermined mapping relationship between content item features and content items;
applying an exact odds model to determine exact scores of the first subset of content items; and
outputting a second subset of content items having highest exact scores among the first subset of content items.

29. The method of claim 28 in which the first subset of content items is identified by computing adjustments to pre-computed baseline scores for content items having features that are affected by the features of the received query according to the first and second mapping relationships.

30. The method of claim 28 in which the content items comprise documents.

31. A system, comprising:
a storage to store scores of a plurality of content items in which the scores are determined based on features of the content items; and
a processing device to:
receive a query,
extract one or more features from the query,
adjust the scores of at least some of the content items based on relationships between the query features and the content item features, the adjustments to the base scores determined at least in part according to a model that includes a first mapping relationship that maps query keys to content item keys and a second mapping relationship that maps content item keys to content items, the query keys representing features of queries and the content item keys representing features of content items, and
select a subset of the plurality of content items having the highest adjusted scores.

32. The system of claim 31 in which the content items comprise documents.

33. A system comprising:
means for storing scores of a plurality of content items in which the scores are determined based on attributes of the content items; and
means for receiving a query,
extracting one or more attributes from the query,
adjusting the scores of at least some of the content items based on relationships between the query attributes and the content item attributes, the adjustments to the base scores determined at least in part according to a model that includes a first mapping relationship that maps query keys to content item keys and a second mapping relationship that maps content item keys to content items, the query keys representing features of queries and the content item keys representing features of content items, and
selecting a number of content items having the highest adjusted scores from the plurality of content items.

* * * * *